United States Patent
Even-Zohar et al.

(10) Patent No.: US 8,548,999 B1
(45) Date of Patent: Oct. 1, 2013

(54) QUERY EXPANSION

(75) Inventors: Yair Even-Zohar, Bellevue, WA (US); Basem Nayfeh, Mercer Island, WA (US)

(73) Assignee: AudienceScience Inc., Bellevue, WA (US)

( * ) Notice: Subject to any disclaimer, the term of this patent is extended or adjusted under 35 U.S.C. 154(b) by 0 days.

(21) Appl. No.: 13/210,328

(22) Filed: Aug. 15, 2011

Related U.S. Application Data

(63) Continuation of application No. 12/171,092, filed on Jul. 10, 2008, now Pat. No. 8,024,341.

(60) Provisional application No. 61/049,381, filed on Apr. 30, 2008.

(51) Int. Cl.
*G06F 7/00* (2006.01)
*G06F 17/30* (2006.01)

(52) U.S. Cl.
CPC . *G06F 7/00* (2013.01); *G06F 17/30* (2013.01)
USPC ............................ 707/736; 707/739; 707/748

(58) Field of Classification Search
None
See application file for complete search history.

(56) References Cited

U.S. PATENT DOCUMENTS

| | | | |
|---|---|---|---|
| 6,704,729 B1 * | 3/2004 | Klein et al. ........................ | 1/1 |
| 8,024,341 B1 | 9/2011 | Even-Zohar et al. | |
| 8,150,842 B2 * | 4/2012 | Brougher et al. ............. | 707/723 |
| 2003/0084035 A1 * | 5/2003 | Emerick, III ...................... | 707/3 |
| 2006/0064411 A1 * | 3/2006 | Gross et al. ....................... | 707/3 |
| 2008/0010274 A1 | 1/2008 | Carus et al. | |
| 2008/0059522 A1 | 3/2008 | Li et al. | |
| 2008/0243826 A1 * | 10/2008 | Bartz et al. ........................ | 707/5 |
| 2009/0165128 A1 * | 6/2009 | McNally et al. ................ | 726/21 |
| 2009/0204610 A1 * | 8/2009 | Hellstrom et al. ................ | 707/5 |
| 2009/0228353 A1 | 9/2009 | Achan et al. | |

OTHER PUBLICATIONS

U.S. Appl. No. 61/013,248, filed Dec. 12, 2007.*
Kearney et al., "Employing a Domain Ontology to Gain Insights into User Behaviour," Proceedings of the 3rd Workshop on Intelligent Techniques for Web Personalization at UCAI 2005, Aug. 1, 2005.
Joshi, A. and R. Motwani, "Keyword Generation for Search Engine Advertising," ICDM'06, 2006.
Abhishek, "Keyword Generation for Search Engine Advertising Using Semantic Similarity Between Terms," WWW2007, May 8-12, 2007, Banff, Canada.
Chirita et al., "Personalized Query Expansion for the Web," SIGIR '07, Jul. 23-27, 2007, Amsterday, The Netherlands.

* cited by examiner

*Primary Examiner* — Jay Morrison
(74) *Attorney, Agent, or Firm* — Perkins Coie LLP

(57) ABSTRACT

An expanded queries data structure is described. The data structure is produced on the basis of a set of seed queries, and consists of entries each specifying an expanded query submitted by a user that has been determined to have a high degree of relatedness to at least a plurality of the seed queries of the set. The expanded queries specified by the entries of the expanded queries data structure can be used to define a segment of users expected to have interests characterized by the seed queries.

9 Claims, 12 Drawing Sheets

| query | doc 1 | doc 2 | doc 3 | ... | doc 10 | all docs |
|---|---|---|---|---|---|---|
| ... | | | | | | |
| travel | to go from one place to another as by car train plane or ship take a trip journey to travel for pleasure | Travel is the transport of people on a trip/journey or the process or time involved in a person or object moving from one location to another Reasons for travel include Tourism Visiting friends and family Trade Commuting | | ... | | to go from one place to another as by car train plane or ship take a trip journey to travel for pleasure Travel is the transport of people on a trip/journey or the process or time involved in a person or object moving from one location to another Reasons for travel include Tourism Visiting friends and family Trade Commuting |
| ... | | | | | | |

*FIG. 5*

| query | co-occurring queries | behavioral index ─700 |
|---|---|---|
| ... | | |
| airfare | travel | ─701 |
| travel | airfare | ─702 |
| ... | | |

| user | time | query | queries 800 |
|---|---|---|---|
| ... | | | |
| 55956 | 1/2/2008 1:03p | travel | 801 |
| 55956 | 1/2/2008 1:12p | airfare | 802 |
| 55956 | 1/2/2008 1:31p | hotel | 803 |
| ... | | | |
| 811 | 812 | 813 | |

*FIG. 8*

| query | co-occurring queries | |
|---|---|---|
| behavioral index | | ~900 |
| ... | | |
| airfare | hotel travel travel | ~901 |
| hotel | airfare travel | ~902 |
| travel | airfare airfare hotel | ~903 |
| ... | | |

QUERY EXPANSION

CROSS-REFERENCE TO RELATED APPLICATIONS

This application is a continuation of U.S. patent application Ser. No. 12/171,092 filed Jul. 10, 2008 now U.S. Pat. No. 8,024,341, which claims the benefit of U.S. Provisional Patent Application No. 61/049,381 filed on Apr. 30, 2008, each of which is incorporated by reference in its entirety.

TECHNICAL FIELD

The described technology is directed to the field of search queries.

BACKGROUND

Online advertising is sometimes targeted using segments, each a groups of users determined to share an interest that tends to make these users good candidates for receiving advertising for a particular cause. It is possible to define a segment of users to include those users that submitted one of a group of queries to a web site. It is typical for this group of queries to be manually defined, by a person such as an editor or a merchandising specialist.

BRIEF DESCRIPTION OF THE DRAWINGS

FIG. 5 is a table diagram showing sample contents of the contextual index.

FIG. 7 is a table diagram showing sample initial contents of a behavioral index constructed in accordance with steps shown in FIG. 6.

FIG. 8 is a table diagram showing a set of sample queries sorted in accordance with step 601.

FIG. 9 is a table diagram showing sample subsequent contents of the behavioral index shown in FIG. 7 after the facility has processed the queries shown in FIG. 8.

DETAILED DESCRIPTION

The inventors have recognized that manually-defined query groups can be under-inclusive, unnecessarily excluding from a segment users that share the common interest that is ultimately the basis for the segment.

Accordingly, a software facility for query expansion ("the facility") is described that automatically selects queries to include in the group specified for a particular segment definition. A human user enters a few seed queries intended to be representative of those typically entered by users desired to be included in the segment. For example, for a segment of users interested in travel, the human user might enter the queries "travel", "expedia", and "plane ticket". The facility relies on a set of actual queries recently received by the web site. The facility uses each of these actual queries to augment both a "behavioral index" and a "contextual index". The behavioral index identifies actual queries that users issue within a short time of one another; the facility augments the behavioral index with the current query by storing indications of other queries issued within a short time of the current query by the same user. The contextual index contains publicly-available information relating to each actual query; the facility updates the contextual index for the current query by submitting the current query to a number of publicly-available information sources, and storing the results provided by the publicly-available information sources together with the actual query in the contextual index.

When the facility receives a set of seed queries for a segment, the facility uses both the behavioral index and contextual index to identify the actual queries that most closely relate to the seed queries in aggregate, and selects these actual queries as expanded queries for use in the segment definition.

By performing in some or all of the manners described above, the group of queries used in the segment definition to include in the segment users who would have otherwise been excluded.

Figure 1:
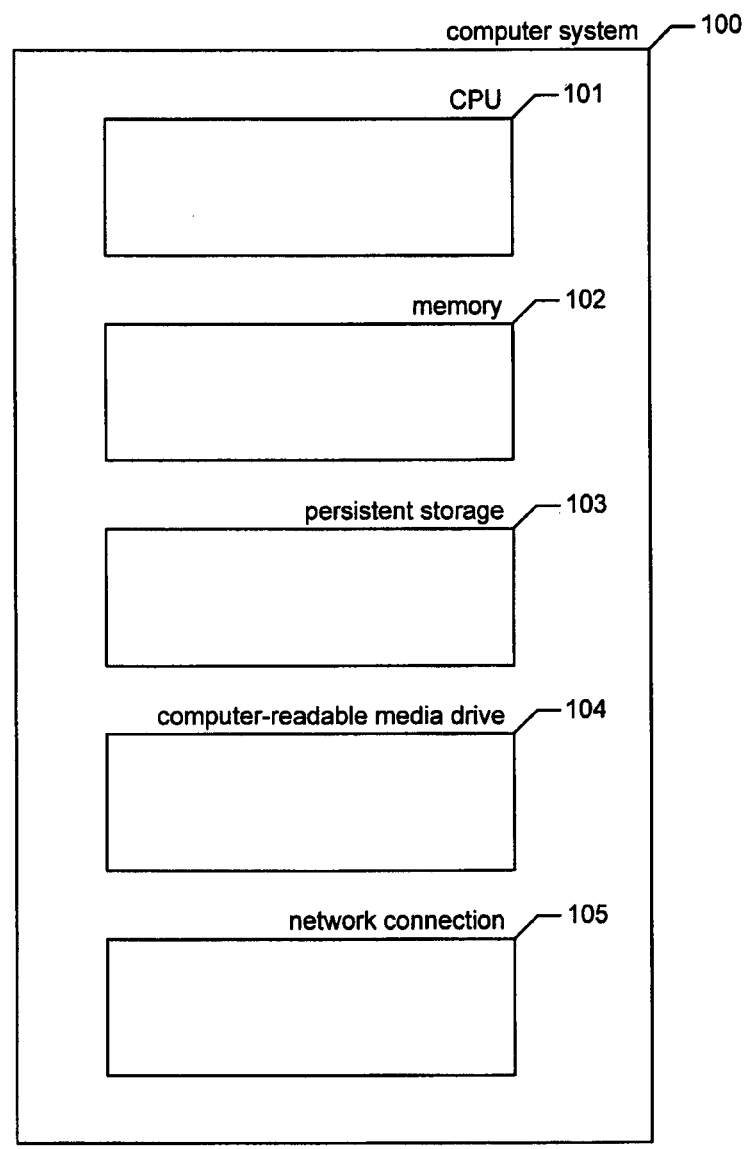
FIG. 1 is a block diagram showing some of the components typically incorporated in at least some of the computer systems and other devices on which the facility executes.

FIG. 1 is a block diagram showing some of the components typically incorporated in at least some of the computer systems and other devices on which the facility executes. These computer systems and devices 100 may include one or more central processing units ("CPUs") 101 for executing computer programs; a computer memory 102 for storing programs and data—including data structures, database tables, other data tables, etc.—while they are being used; a persistent storage device 103, such as a hard drive, for persistently storing programs and data; a computer-readable media drive 104, such as a CD-ROM drive, for reading programs and data stored on a computer-readable medium; and a network connection 105 for connecting the computer system to other computer systems, such as via the Internet, to exchange programs and/or data—including data structures. In various embodiments, the facility can be accessed by any suitable user interface including Web services calls to suitable APIs. While computer systems configured as described above are typically used to support the operation of the facility, one of ordinary skill in the art will appreciate that the facility may be implemented using devices of various types and configurations, and having various components, such as wireless telephones and similar devices.

Figure 2:
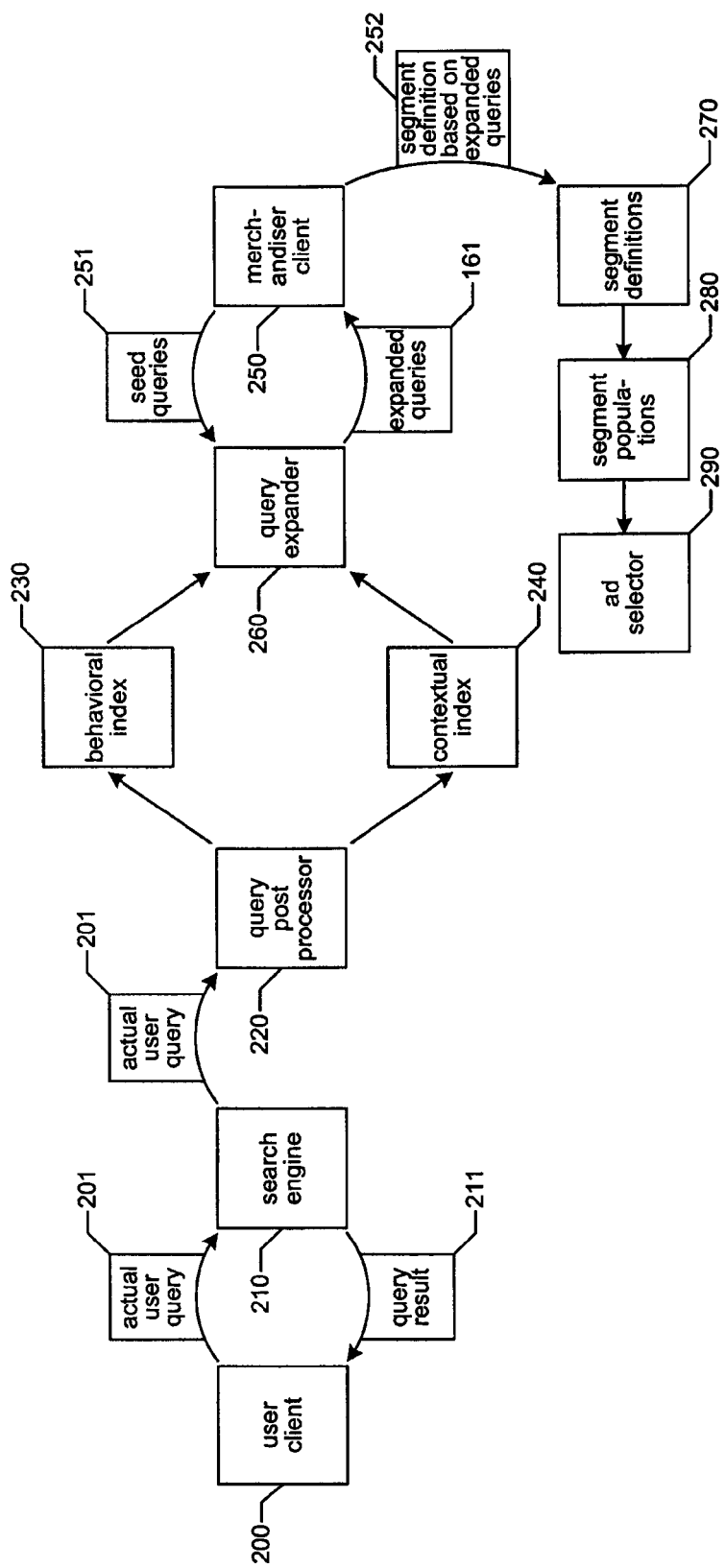
FIG. 2 is a flow diagram showing interactions performed in accordance with the facility.

FIG. 2 is a flow diagrams showing interactions performed in accordance with the facility. A user client 200 issues an actual user query 201 to a search engine 210. The search engine returns a query result 211 to the user client. The search engine also passes the actual user query to a query post processor 220. The query post processor uses accumulated actual user queries to generate both a behavioral index 230 and a contextual index 240, both of which are used by a query expander 260 as discussed below. A user of a merchandiser client 250 generates a set 251 of seed queries to be used in defining a segment. The query expander uses the behavioral index and contextual index to generate a set of expanded queries 161 from the set of seed queries. The merchandiser client then generates a segment definition that is based upon the expanded queries (and in some cases the seed queries) 252. This new segment definition is stored among a set of segment definitions 270. Each of the segment definitions 270 is used to generate a population, i.e., a list of qualifying users, for the segment definition. These segment populations can then be used by an ad selector 290 to select advertising messages to present to users based upon their membership in different segment populations.

Figure 3:
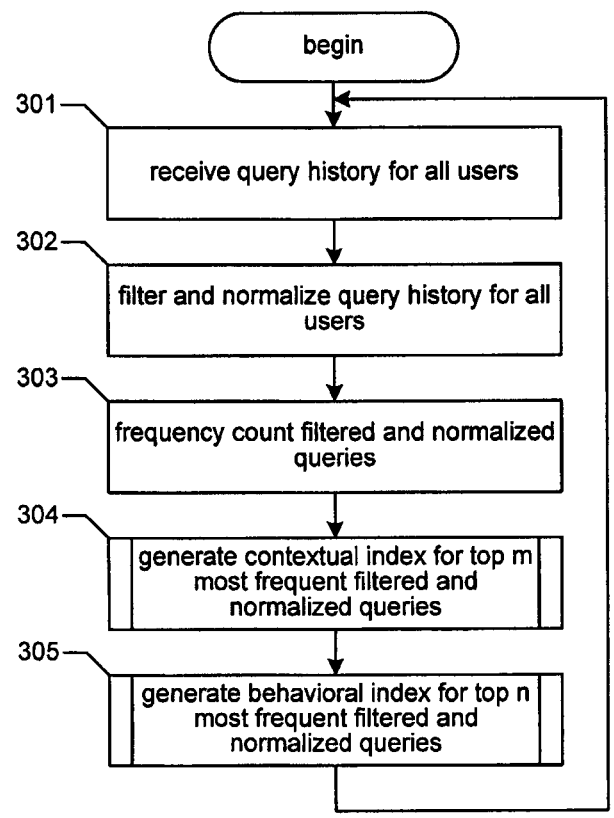
FIG. 3 is a flow diagram showing steps typically performed by the facility in order to process actual queries.

FIG. 3 is a flow diagram showing steps typically performed by the facility in order to process actual queries. In step 301, the facility receives a history of actual queries submitted by all users, or all users in a particular group. In step 302, the facility filters and normalizes the received query history. In some embodiments, this involves removing queries that are too short (such as less than 2 characters long) or too long (such as more than 50 characters long). In some embodiments, step 302 involves generating a lemma for each search term in the query, such as by applying an analyzer such as the Snowball analyzer available from Snowball.tartarus.org or otherwise stemming or homogenizing different forms of the same word. In step 303, the facility frequency-counts the filtered and normalized queries. That is, it determines the number of occurrences of each unique query in this set. In step 304, the facility generates a contextual index for the top m most frequent filtered and normalized queries. In various embodiments, m takes on a variety of values. In some embodiments, m is set at or about 70,000 queries. Step 304 is discussed in greater detail below in connection with FIG. 4. In step 305, the facility generates a behavioral index for the top n most frequent and normalized queries. In various embodiments, different values of n are used. In some embodiments, the value for n is set at or near 200,000 queries. Step 305 is discussed in additional detail below in connection with FIG. 6. After step 305, the facility continues in step 301 to receive the next query history. In some embodiments, this process is repeated periodically, such as daily, weekly, or monthly.

Those skilled in the art will appreciate that the steps shown in FIG. 3 and in each of the flow diagrams discussed below may be altered in a variety of ways. For example, the order of the steps may be rearranged; some steps may be performed in parallel; shown steps may be omitted, or other steps may be included; etc.

Figure 4:
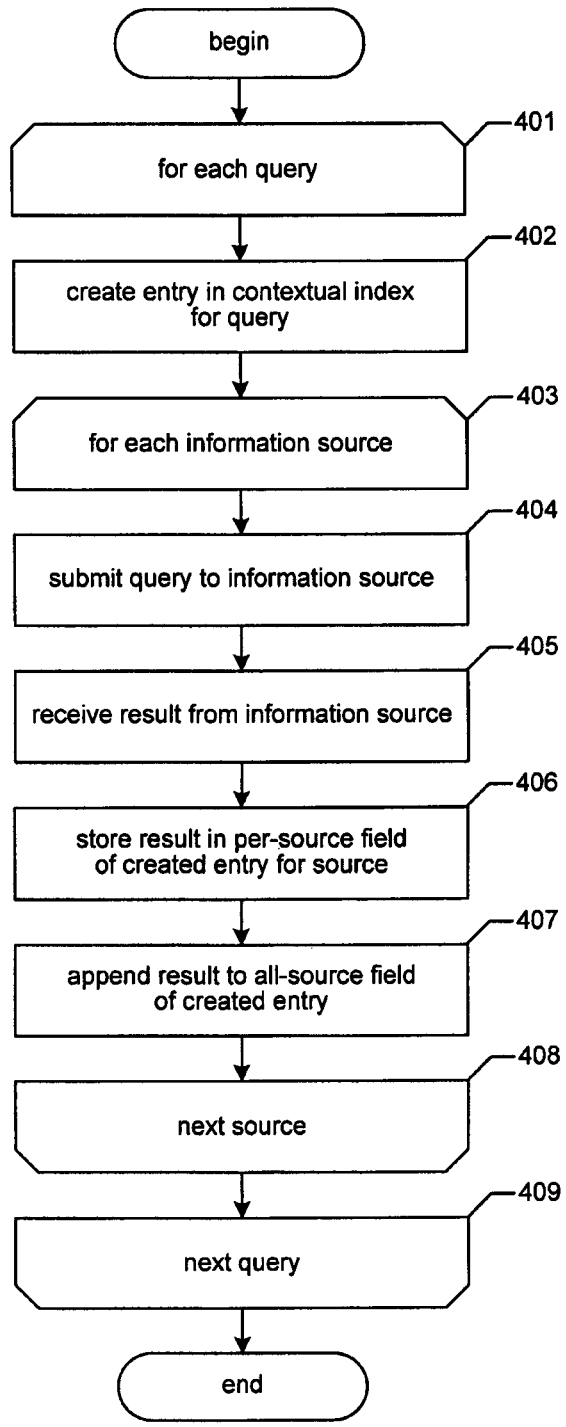
FIG. 4 is a flow diagram showing steps typically performed by the facility in order to generate the contextual index.

FIG. 4 is a flow diagram showing steps typically performed by the facility in order to generate the contextual index. In steps 401-409, the facility loops though each unique query selected for inclusion in the contextual index. In step 402, the facility creates an entry in the contextual index for the query.

FIG. 5 is a table diagram showing sample contents of the contextual index. The contextual index 500 contains an entry for each query selected for inclusion in the contextual index, such as entry 501. For each entry, column 511 contains the query. In some embodiments, the query is the normalized version of the query generated in step 302 discussed above.

Returning to FIG. 4, in steps 403-408, the facility loops through each of a number of different publicly-available information sources. These can include on-line dictionaries, thesauruses, encyclopedias, search engines, product and/or service databases, news services, etc. In step 404, the facility submits the current query as a query to the current information source. In step 405, the facility receives a result from the information source in response to the submitted query. In step 406, the facility stores the result received in step 405 in a per-source field for the current source in the entry created in step 402. In step 407, the facility appends the result received in step 405 to an all-source field of the entry created in step 402.

Returning to FIG. 5, each of columns 512-521 is a per-source field. It can be seen that, in row 501, text from a first information source has been stored in column 512, while text from a second information source has been stored in column 513. Further, column 522 contains a concatenated version of the responses from all information sources.

While FIG. 5 and each of the table diagrams discussed below show a table whose contents and organization are designed to make them more comprehensible by a human reader, those skilled in the art will appreciate that actual data structures used by the facility to store this information may differ from the table shown, in that they, for example, may be organized in a different manner; may contain more or less information than shown; may be compressed and/or encrypted; etc.

Returning to FIG. 4, in step 408, if additional sources remain to be processed, then the facility continues in step 403 to process the next source. In step 409, if additional queries remain to be processed, then the facility continues in step 401 to process the next query. After step 409, these steps conclude.

Figure 6:
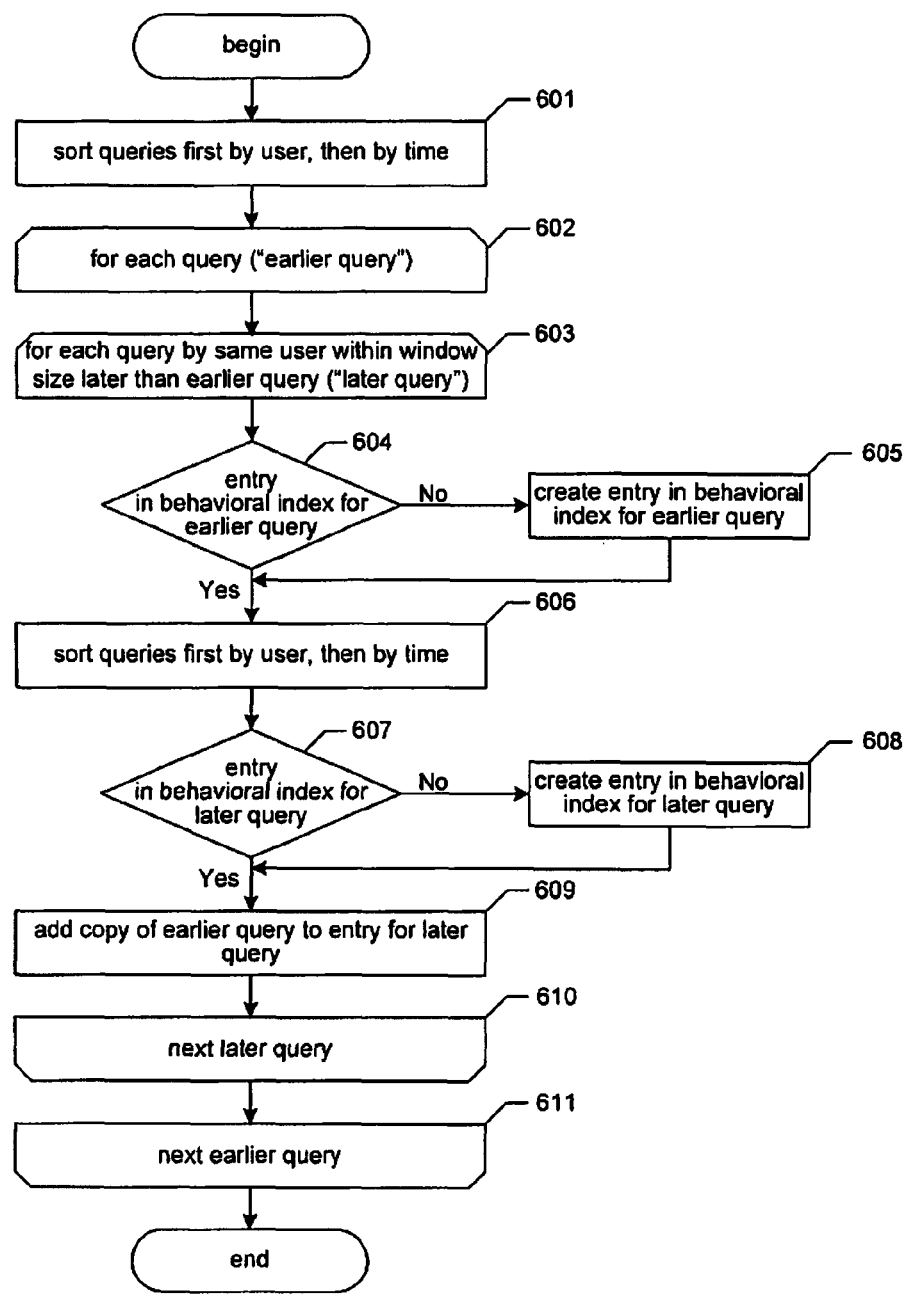
FIG. 6 is a flow diagram typically performed by the facility to generate the behavioral index.

FIG. 6 is a flow diagram typically performed by the facility to generate the behavioral index. In step 601, the facility sorts all of the individual query occurrences selected for inclusion in the behavioral index first by user, then by time. In steps 602-611, the facility loops through each of these queries. The index of this loop is called the "earlier query". In steps 603-610, the facility loops through each query that is by the same user as the earlier query, that occurred later than the earlier query, and that occurred no more than a window size later than the earlier query. This window size is set in order to capture queries that occurred relatively closely in time, and that are likely to correspond to a single effort to locate information on a subject. The index of this loop is called the "ladder query". In step 604, if the behavioral index contains an entry for the earlier query, then the facility continues in step 606, else the facility continues in step 605. In step 605, the facility creates an entry in the behavioral index for the earlier query. After step 605, the facility continues in step 606. In step 606, the facility adds a copy of the later query to the entry for the earlier query. In step 607, if the behavioral index creates an entry for the later query, then the facility continues in step 609, else the facility continues in step 608. In step 608, the facility creates an entry in the behavioral index for the later query. After step 608, the facility continues in step 609. In step 609, the facility adds a copy of the earlier query to the entry for the later query. In step 610, if additional later queries remain for processing, then the facility continues in step 603 to process the next later query, else the facility continues in step 611. In step 611, if additional earlier queries remain for processing, then the facility continues in step 602 to process the next earlier query, else these steps conclude. In some embodiments, steps 606 and 609 can be performed without steps 605 and 608, respectively. In such embodiments, steps 604-605 and 607-608 are omitted.

FIG. 7 is a table diagram showing sample initial contents of a behavioral index constructed in accordance with steps shown in FIG. 6. The behavioral index contains rows each corresponding to a query, such as rows 701-702. Each row is divided into a query column 711 containing an actual query and a co-occurring query is column 712 containing all of the queries that co-occur with the query contained in the query column. For example, row 701 indicates that the "travel" query co-occurs with the "airfare" query.

FIG. 8 is a table diagram showing a set of sample queries sorted in accordance with step 601. The table 800 contains rows, such as rows 801-803, each corresponding to a query submitted by a user. Each row is divided into the following columns: a user column 811 containing an identifier that uniquely identifies the user submitting the query; a time column 812 that indicates the time at which the query was submitted; and a query column 813 containing the submitted query. For example, row 801 indicates that user 55956 submitted the "travel" query at 1:03 p.m. on Jan. 1, 2008. Suppose that the behavioral index has the contents shown on FIG. 7 and the facility is performing the steps shown in FIG. 6.

FIG. 9 is a table diagram showing sample subsequent contents of the behavioral index shown in FIG. 7 after the facility has processed the queries shown in FIG. 8. When the early query was "travel" and the later query was "airfare", the facility added a second occurrence of "travel" to the "airfare" entry 901 and added a second occurrence of "airfare" to the "travel" entry 902. When the earlier query was "travel" and the later query was "hotel", the facility added an occurrence of "hotel" to the "travel" entry 902; added the "hotel" entry 903; and added to the new "hotel" entry 903 an occurrence of "travel". When the earlier query was "airfare" and the later query was "hotel", the facility added an occurrence of "hotel" to the "airfare" entry 901, and added an occurrence of "airfare" to the "hotel" entry 903.

Figure 10:
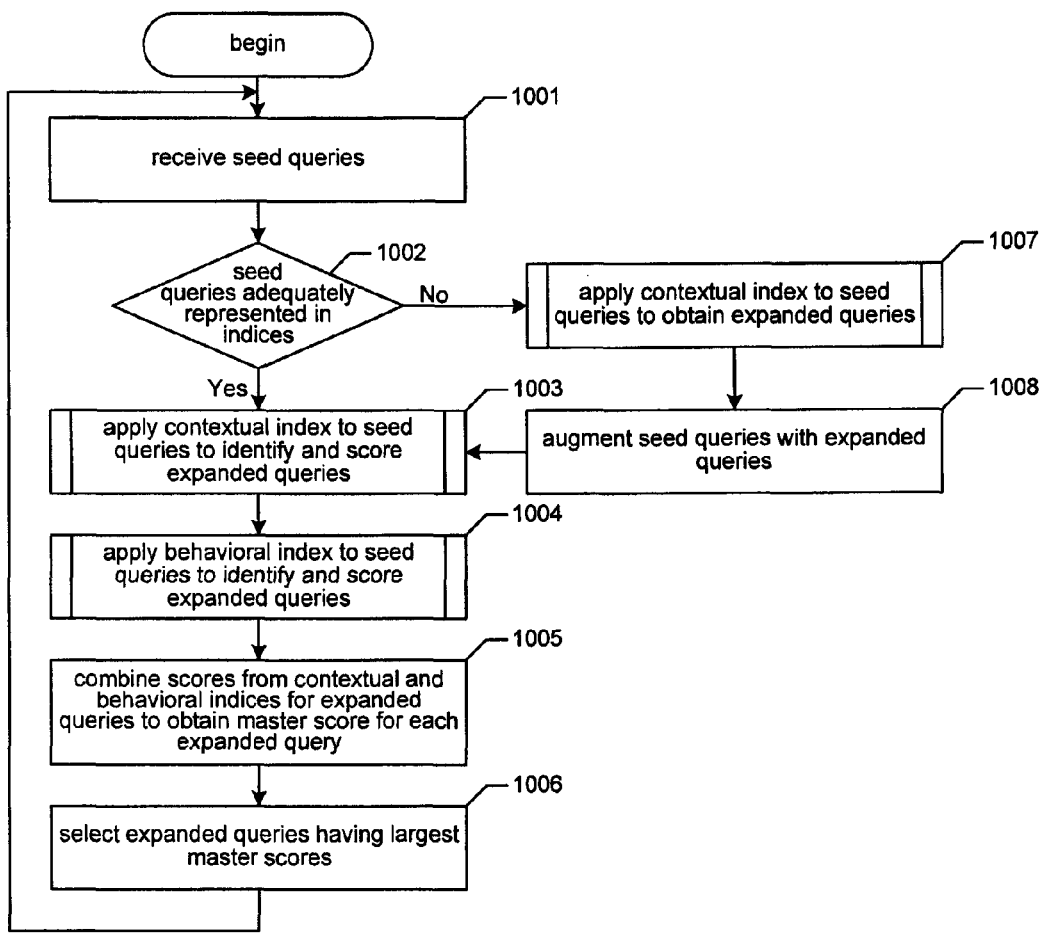
FIG. 10 is a flow diagram showing steps typically performed by the facility to generate a set of expanded queries for a set of seed queries.

FIG. 10 is a flow diagram showing steps typically performed by the facility to generate a set of expanded queries for a set of seed queries. In step 1001, the facility receives a set of seed queries to be expanded. In step 1002, if the seed queries are adequately represented in the contextual and behavioral indices, then the facility continues in step 1003, else the facility continues in step 1007. In step 1003, the facility applies the contextual index generated in accordance with FIG. 4 to the seed queries received in step 1001 to identify and score expanded queries that are based on the seed queries. Step 1003 is described in greater detail below in connection with FIG. 11. In step 1004, the facility applies the behavioral index generated in accordance with FIG. 6. Step 1004 is described in additional detail below in connection with FIG. 12. In step 1005, the facility combines scores produced by both the contextual and behavioral indices for the expanded queries to obtain a master score for each expanded query. In some embodiments, this combination of contextual and behavioral scores for an expanded query involves summing the contextual score, the behavioral score, and the lower of the contextual score and the behavioral score. In some embodiments, the combination weights the contextual and behavioral scores based upon the amount of information contained by each the contextual and the behavioral index that is relevant to the expanded queries, the seed queries, or both. In step 1006, the facility selects the expanded queries having the largest master scores, such as the expanded queries having scores exceeding a minimum threshold, or a fixed number of the expanded queries having the highest scores. After step 1006, the facility continues in step 1001 to receive the next set of seed queries.

In step 1007, where the seed queries are determined to be inadequately represented in the indices, the facility applies the contextual index to the seed queries in a manner similar to that of step 1003 to obtain expanded queries. In step 1008, the facility augments the seed queries received in step 1001 with the expanded queries obtained in step 1007. After step 1008, the facility continues in step 1003 using the augmented set of seed queries.

Figure 11:
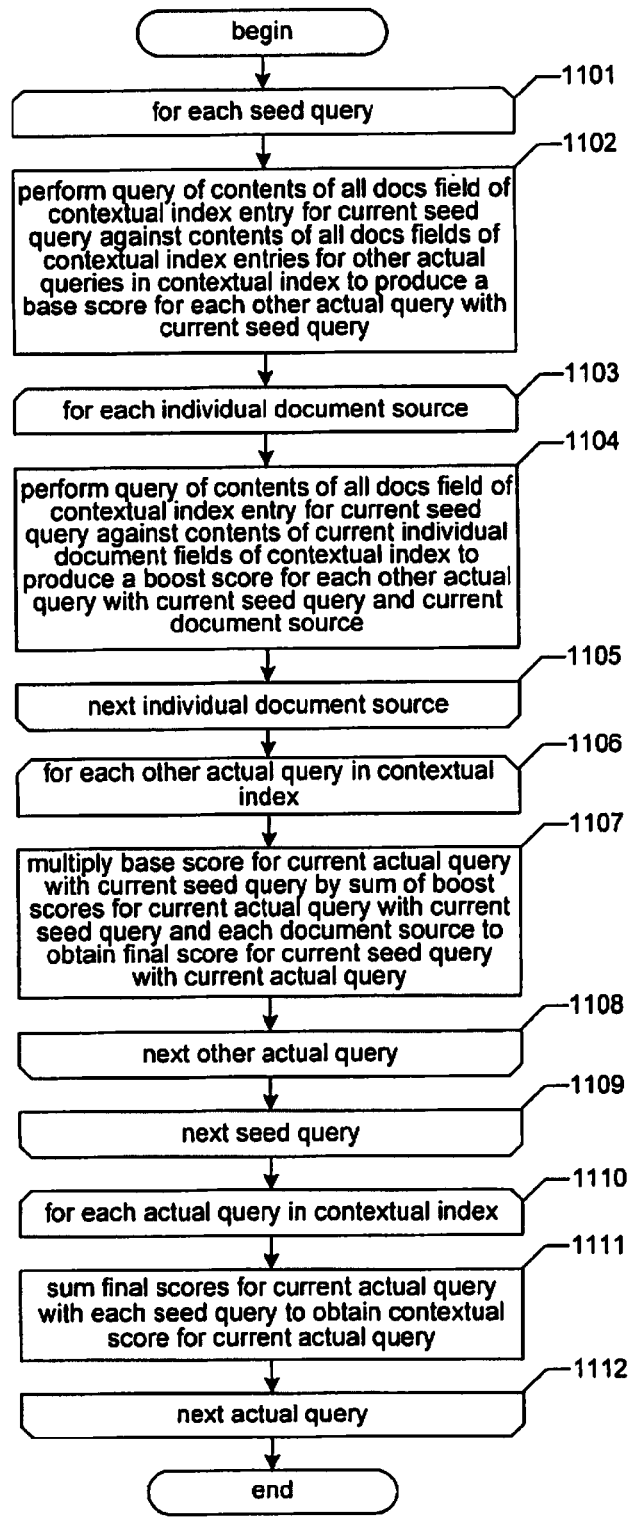
FIG. 11 is a flow diagram showing steps typically performed by the facility in order to apply the contextual index to a set of seed queries to identify and score expanded queries.

FIG. 11 is a flow diagram showing steps typically performed by the facility in order to apply the contextual index to a set of seed queries to identify and score expanded queries. In steps 1101-1109, the facility loops through the seed queries. In step 1102, the facility produces a base score for each query in the contextual index other than the current seed query by using a query engine to perform a query seeking to match the contents of the all documents field of the contextual index entry for the current seed query against contents of the all documents fields of contextual index entries for the other actual queries. If the seed query was "travel", the facility would compare the text in column 522 for entry 501 to the text in column 522 for each of the other entries of the contextual index. The query result indicates, for each of the other queries in the contextual index, the degree of similarity of its all documents field to the all documents field of the travel entry. In steps 1103-1105, the facility loops through each individual document source. In step 1104, the facility produces a boost score for each other actual query with the current seed query and the current document source by performing a query of the contents of the all documents field of the contextual index entry for the current seed query against the contents of the current individual document fields of the contextual index entries for the other queries. In terms of FIG. 5, for the individual document source corresponding to document 1 column 512, the facility performs a query seeking to match the contents of column 512 for row 501 to the contents of the column 512 for each of the other entries of the contextual index. In step 1105, if additional individual document sources remain to be processed, then the facility continues in step 1103, else the facility continues in step 1106. In steps 1106-1108, the facility loops through each other actual query in the contextual index. In step 1107, the facility obtains a final score for the current seed query with the current actual query by multiplying the base score determined in step 1102 for the current actual query with the current seed query by the sum of the boost scores determined in step 1104 for the current actual query with the current seed query and each document source. This basis for determining the final score for the current seed query with the current actual query tends to favor seed queries that match the text retrieved from a large number of different information sources over those that match text received from only a small number of information sources. In step 1108, if additional other actual queries remain to be processed, then the facility continues in step 1106 to process the next other actual query, else the facility continues in step 1109. Step 1109, if additional seed queries remain to be processed, then the facility continues in step 1101 to process the next seed query, else the facility continues in step 1110. In steps 1110-1112, the facility loops through each actual query in the contextual index that has a final score greater than zero. In step 1111, the facility determines a contextual score for the current actual query by summing the final scores for the current actual query with each seed query determined in step 1107. In step 1112, if additional actual queries remain to be processed, then the facility continues in step 1110 to process the next actual query, else these steps conclude.

Figure 12:
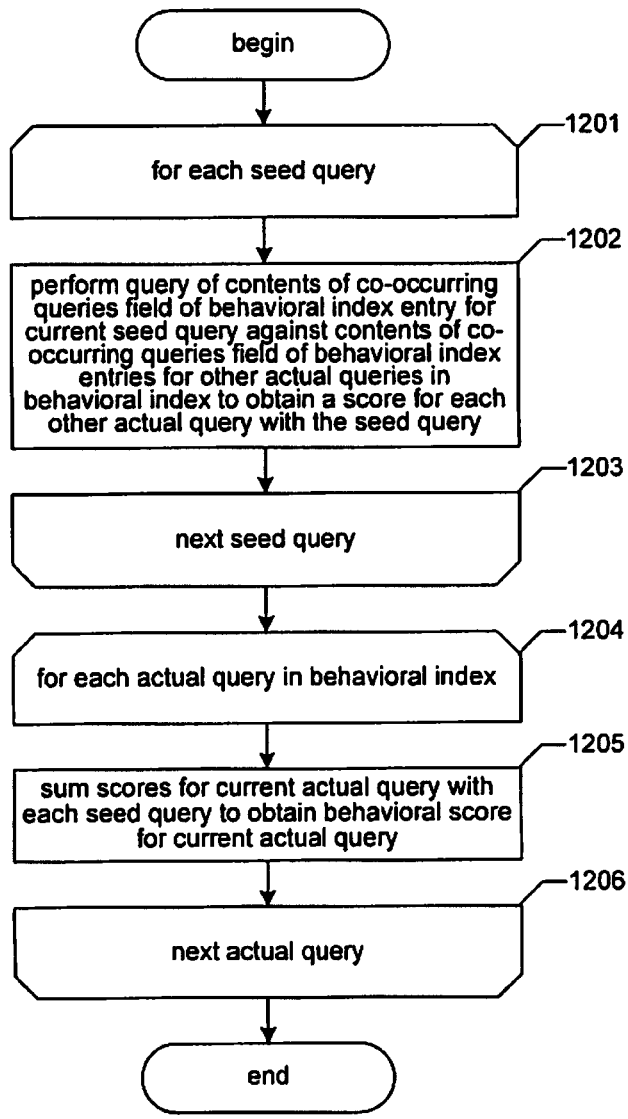
FIG. 12 is a flow diagram showing steps typically performed by the facility in order to apply the behavioral index to the set of seed queries to identify and score expanded queries.

FIG. 12 is a flow diagram showing steps typically performed by the facility in order to apply the behavioral index to the set of seed queries to identify and score expanded queries. In steps 1201-1203, the facility loops through each seed query. In step 1202, the facility determines a score for each other actual query with the seed query by performing a query of the contents of the co-occurring queries field of the behavioral index entry for the current seed query against contents of the co-occurring queries field of behavioral index entries for the other actual queries in the behavioral index. In terms of FIG. 9, if the current seed query is "airfare" then the facility would query the contents of the co-occurring queries column 912 for the "airfare" entry 901 against the contents of that column for the "travel" entry 902 and the "hotel" entry 903. Typically, the facility would attribute a higher score to the "hotel" actual query—whose single occurrence of "travel"

matches two of the occurrences of travel in entry 901—than "travel", which only has a single instance of "hotel" matching a single instance of "hotel" in entry 901. In step 1203, if additional seed queries remain to be processed, then the facility continues in step 1201 to process the next seed query, else the facility continues in step 1204. In steps 1204-1206, the facility loops through each actual query in the behavioral index that has a final score greater than zero. In step 1205, the facility determines the behavioral score for the current actual query by summing the scores for the current actual query with each seed query. In step 1206, if additional actual queries remain to be processed, then the facility continues in step 1204 to process the next actual query, else these steps conclude.

It will be appreciated by those skilled in the art that the above-described facility may be straightforwardly adapted or extended in various ways. While the foregoing description makes reference to particular embodiments, the scope of the invention is defined solely by the claims that follow and the elements recited therein.

We claim:

1. A method in a computing system for constructing an index usable to identify expanded queries for a set of seed queries, comprising:
   receiving a query history identifying, for each of a plurality of queries received from users, text of the query, a user submitting the query, and a time at which the query was submitted;
   for each unique query identified by the query history:
      for each user:
         for every submission of the unique query by the user:
            adding to an entry of the index for the unique query an instance of any query submitted by the user within a predetermined time period of the submission of the unique query by the user;
   receiving a set of seed queries;
   for each of the seed queries of the set:
      identifying an entry of the index corresponding to the seed query;
      submitting to a search engine a request to match the query instances added to the identified entry against the query instances added to the entries of the index other than the identified entry;
      receiving from the search engine a score for each entry of the index other than the identified entry indicating the extent to which the query instances added to the identified entry matches the query instances added to the entry; and
      selecting as expanded queries the queries corresponding to the entries of the index other than the identified entry having the highest scores.

2. The method of claim 1, further comprising, before the adding, normalizing the text of the queries identified by the query history.

3. The method of claim 1, further comprising constructing a segment definition based on the selected expanded queries.

4. The method of claim 3 wherein the constructed segment definition is further based on the set of seed queries.

5. A computer-readable medium whose contents cause a computing system to perform a method for constructing an index usable to identify expanded queries for a set of seed queries, the method comprising:
   receiving a query history identifying, for each of a plurality of queries received from users, text of the query, a user submitting the query, and a time at which the query was submitted;
   for each unique query identified by the query history:
      for each of a plurality of publicly-available information sources:
         submitting the unique query as a query to the publicly-available information source;
         receiving a response to the submitted query; and
         storing text contained by the response in an entry of the index for the unique query
   receiving a set of seed queries;
   for each of the seed queries of the set:
      identifying an entry of the index corresponding to the seed query;
      submitting to a search engine a request to match the text stored in the identified entry against the text stored in the entries of the index other than the identified entry;
      receiving from the search engine a score for each entry of the index other than the identified entry indicating the extent to which the text stored in the identified entry matches the text stored in the entry; and
      selecting as expanded queries the queries corresponding to the entries of the index other than the identified entry having the highest scores.

6. The computer-readable medium of claim 5, the method further comprising, before the adding, normalizing the text of the queries identified by the query history.

7. The computer-readable medium of claim 5, the method further comprising:
   storing in each entry indications of the information source from which different portions of the text stored in the entry was received;
   for each query corresponding to the entries of the index other than the identified entry, before the selecting, weighting the score in accordance with the number of information sources from which text matching the text stored in the identified entry was received.

8. The computer-readable medium of claim 5, the method further comprising constructing a segment definition based on the selected expanded queries.

9. The computer-readable medium of claim 8 wherein the constructed segment definition is further based on the set of seed queries.

* * * * *